W. M. EDMONT.
AUTOMATIC IGNITION CONTROL.
APPLICATION FILED JUNE 3, 1918.

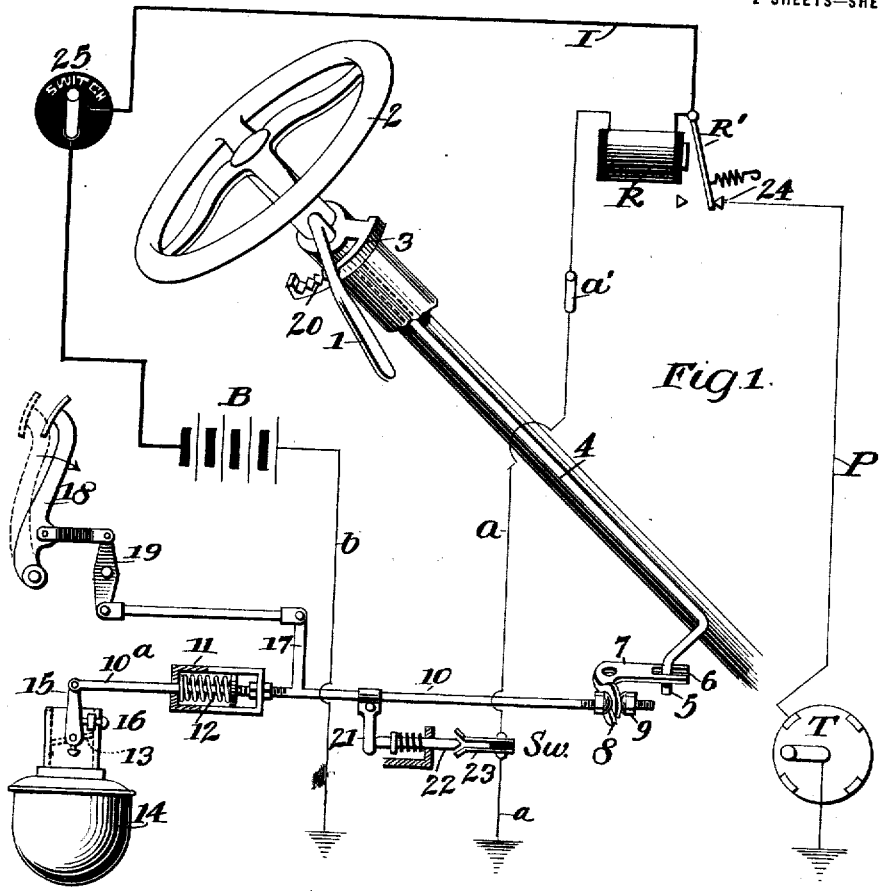
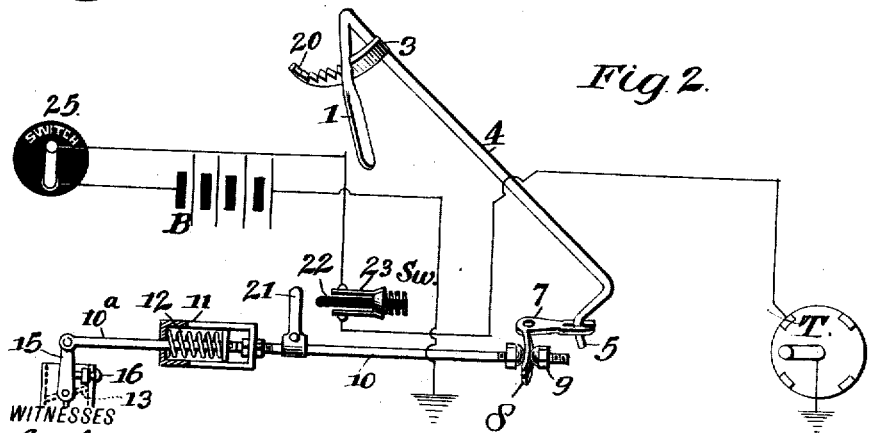

1,301,411.

Patented Apr. 22, 1919.
2 SHEETS—SHEET 2.

WITNESSES
J. P. Schrott

INVENTOR
William M. Edmont
BY
ATTORNEYS

UNITED STATES PATENT OFFICE.

WILLIAM M. EDMONT, OF DULUTH, MINNESOTA.

AUTOMATIC IGNITION CONTROL.

1,301,411.  Specification of Letters Patent.  Patented Apr. 22, 1919.

Application filed June 3, 1918. Serial No. 238,009.

*To all whom it may concern:*

Be it known that I, WILLIAM M. EDMONT, a citizen of the United States, and a resident of Duluth, in the county of Saint Louis and State of Minnesota, have invented certain new and useful Improvements in Automatic Ignition Controls, of which the following is a specification.

My invention relates to improvements in electric circuit controlling mechanism, being more particularly adapted for use in connection with the ignition circuit of an automobile engine, and it consists in the constructions, combinations and arrangements herein described and claimed.

An object of my invention is to provide an ignition cut off for an automobile engine which is operatively combined with the throttle valve operating mechanism in such a manner that upon closing the throttle, the ignition circuit is automatically broken, rendering the engine "dead" and causing it to run against the compression in the cylinders thus providing an effective brake.

Another object of the invention is to provide a device of the character described, wherein in descending hills, the mere act of closing the throttle automatically cuts off the ignition and causes the engine to work as an air compressor which instantly checks the momentum of the car; the cushioning effect thus obtained by the compression in the engine reducing to a great degree the usual shocks and jars experienced upon using the ordinary brakes in a like circumstance.

A further object of the invention is to provide an automatically operating ignition control which enables the breaking of the ignition circuit and consequently instantly rendering the engine inactive, without removing the hand from the steering wheel to seek the ordinary switch lever.

A further object of the invention is to provide a device as described which enables the maintaining of a much higher speed upon approaching a desired stopping place, since by the use of the device the rendering inactive of the engine and breaking of the ignition circuit is practically a simultaneous act and one which at once transforms the engine into a pneumatic brake which quickly reduces the momentum of the car and makes necessary only a light application of the ordinary foot brake.

Figure 3:
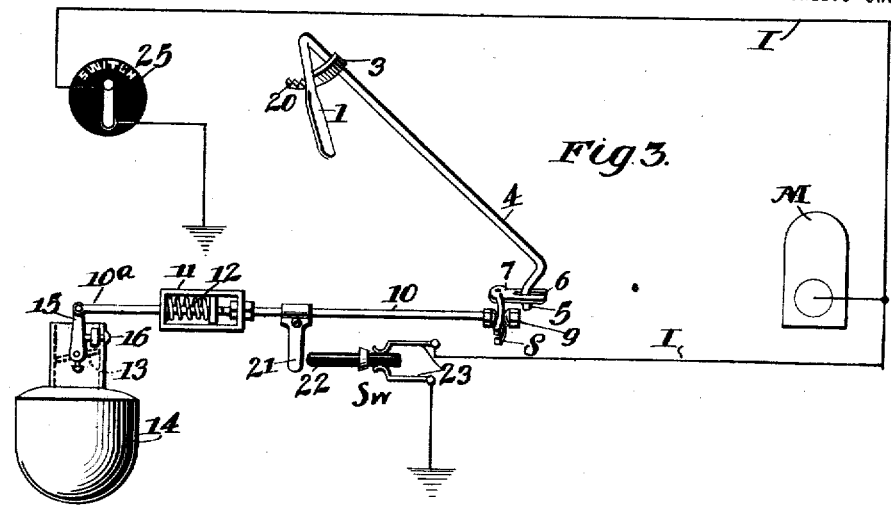
Figure 4:
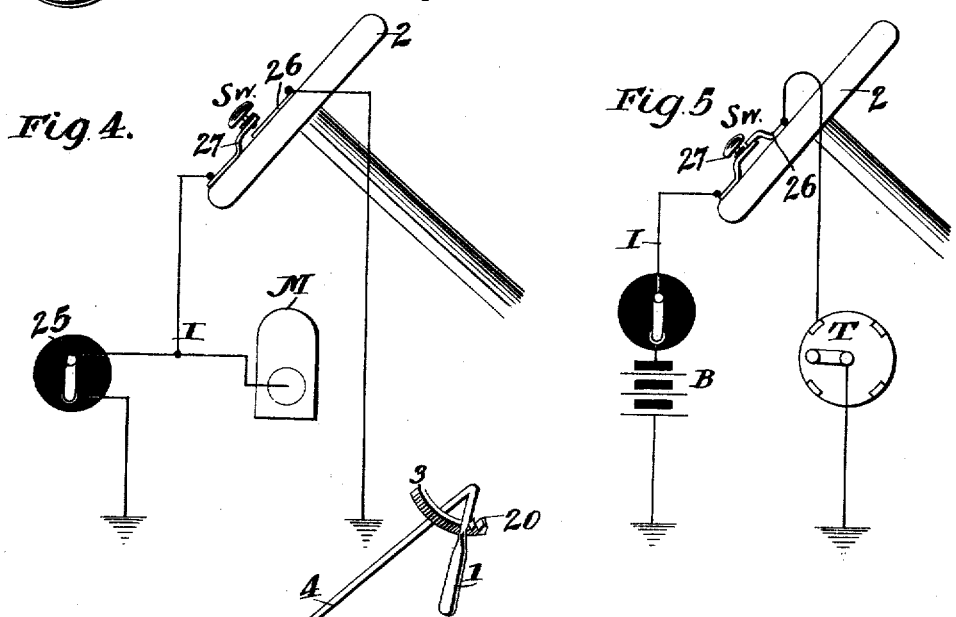
Figure 5:
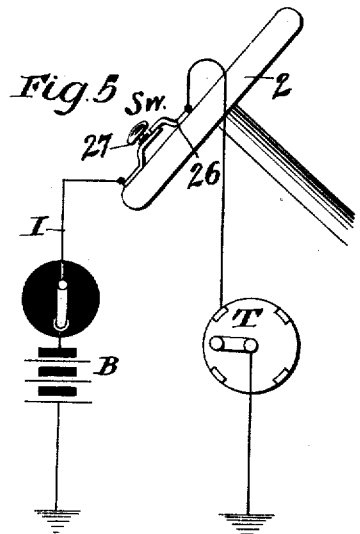
Figure 6:
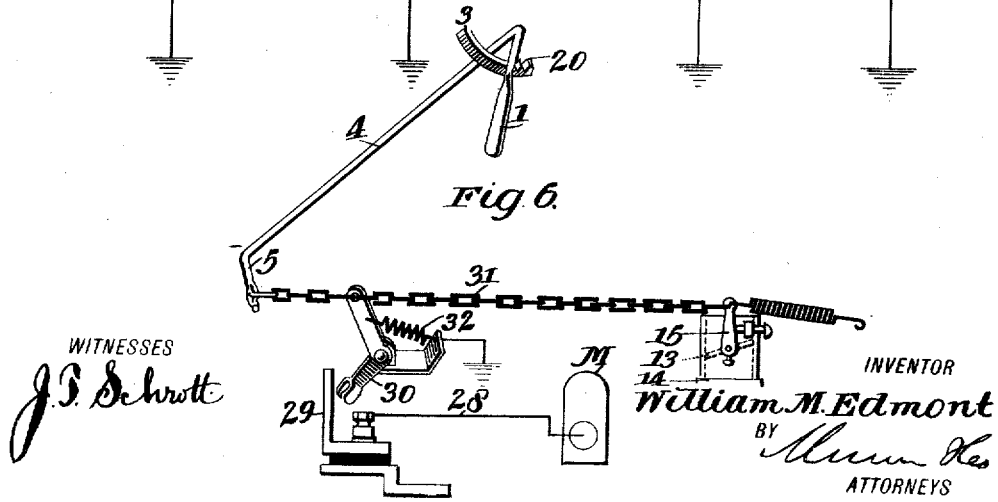

Other objects and advantages will appear in the following specification, reference being had to the accompanying drawings, in which:

Figure 1 is a diagrammatic view showing the preferred arrangement of the automatic cut-out mechanism, Fig. 2 is a diagrammatic view illustrating another embodiment of the invention, Fig. 3 is a diagrammatic view showing the arrangement in a magneto circuit, Fig. 4 illustrates an arrangement for grounding the magneto, Fig. 5 shows another arrangement somewhat on the same order for opening the battery ignition circuit, and Fig. 6 is a diagrammatic view illustrating a special grounding device for the magneto.

In carrying out my invention, different arrangements have been devised for promoting one underlying principle, namely, the stopping of the engine simultaneously with the closing of the throttle valve in order to transform the engine into an air brake and consequently reducing the momentum of the car within a very short time. Attention is first directed to Fig. 1, wherein the preferred embodiment of the invention is illustrated.

The throttle lever 1 is located in the usual relationship with the steering wheel 2 and is arranged to move over the segment 3 which is supported beneath the steering wheel. The throttle lever 1 includes the rod 4 which extends down alongside the steering wheel post and terminates in a bent end 5. The end 5 works in the slotted end 6 of a pivoted bell crank 7. The other arm of the bell crank is forked at 8 and works between a pair of abutments 9 on a throttle rod 10.

The throttle rod 10 is made in two parts which are connected together by a flexible link 11. This link consists of a frame secured at one end to the rod 10 and provided at the other end with a hole which admits the other part 10ᵃ of the throttle rod. A spring 12 interposed between said end of the frame and a washer on the end of the rod 10ª provides the necessary flexibility of the link for enabling the rod 10 to move toward the right even after the throttle valve 13 of the carbureter 14 is wholly closed. It is to be observed that the rod 10ª is connected to the arm 15 of the throttle lever and that the arm abuts an adjusting screw 16 of the usual construction on the right. The spring 12 in the frame 11 is sufficiently stiff to enable the operation of the arm 15 of the throttle valve in the region beyond the abutment screw 16. But it will be readily seen that after the arm 15 once engages the screw 16 and additional movement of the throttle rod 10 toward the right occurs, by reason of the additional turning of the throttle lever 1 in the other direction, the spring 12 in the frame 11 will close and permit the movement just referred to.

A standard 17 on the rod 10 enables the connection of the accelerator pedal 18 with the throttle rod through the medium of the lever and link devices 19. Upon pressing down upon the pedal 18, the throttle valve 13 is opened. In the ordinary driving of the car, the operator keeps his foot on the pedal 18 and maintains a certain pressure thereon even though it may be light. In the event of an accident under circumstances that will be presently described, the act of removing his foot from the pedal will serve to break the ignition circuit of the engine.

This leads to a consideration of the means whereby the ignition circuit is automatically broken either through the action of the accelerator pedal as just described, or the action of the throttle lever 1. The position now occupied by the throttle lever 1 in Fig. 1 of the drawings represents the complete closure of the throttle valve 19. When this position is reached, the operator knows that further movement of the throttle lever toward the left will obtain the breaking of the ignition circuit. To further this end the segment 3 is provided with notches 20 over which the throttle lever is arranged to move. Further movement of the throttle lever as just described, causes additional movement of the throttle rod 10 toward the right so that a finger 21 on the throttle rod engages the end of a contact making plunger 22. The plunger 22 enters the space between the contacts 23 of the open circuit switch Sw and closes a shunt circuit.

This shunt circuit includes the wires a. One of the wires is grounded and the other leads to the magnet R and has a switch a' by means of which the shunt circuit may be entirely cut out if desired. In the present instance and for the operation of the device, the switch a' is closed. Another wire b which is common to both the shunt circuit and to the ignition circuit, leads from the battery B and is grounded. The continuation of the shunt wire a beyond the windings of the magnet R connects to the pivotal point of the armature R' of the relay. To this point, one end of a wire I of the ignition circuit connects.

The complete wiring and the various devices included in the ignition circuit of the engine are omitted from the present illustration, it being desired to emphasize the means for breaking the circuit and not cause confusion by the illustration of devices which in the present instance are not essential to the understanding of the operation of the device. Continuing then, the ignition circuit includes the primary wire P which connects at one end to a contact 24 of the relay and at the other end to one of the terminals of a timer T. The continuation of the wire is grounded as illustrated. The ordinary ignition switch 25 is embraced in the wire I and the continuation of the wire leads to the positive pole of the battery B.

The operation of the mechanism in Fig. 1 is as follows: Continued movement of the throttle lever 1 toward the left over the teeth 20 of the segment 3 causes the movement of the throttle rod 10 toward the right and the closure of the normally open circuit switch Sw. Current now flows from the positive pole of the battery B, through the switch 25, over the wire I to the magnet R, over the wire a to ground and returning to the negative pole of the battery B via the wire b. The magnet R now being energized, attracts the armature R' so that it leaves the contact 24 and opens the ignition circuit P. It will be evident that before the action that has just been described takes place, current flows from the positive pole of the battery B through the switch 25, over the wire I, armature R', primary wire P, through the timer T to ground, returning to the negative pole of the battery B via the wire b.

The arrangement illustrated in Fig. 2 is substantially the same as that illustrated in Fig. 1 and it will be observed that similar reference characters indicate like parts shown in Fig. 1. One difference consists in the omission of the magnet R and the second difference consists in the construction of the switch Sw. In this case, the switch Sw is of the closed circuit type, wherein the plunger 22 which carries the contact is pressed forwardly toward the finger 21 on the rod 10 by a spring and thus the contacts 23 are normally bridged. Upon continued movement toward the right of the rod 10, that is to say, after the throttle lever 1 begins to move over the teeth 20, the finger 21 will engage the plunger 22 causing the contact maker on the plunger to leave the contacts 23 and thus open that portion of the circuit in which the contacts 23 are embraced.

In Fig. 3 the ignition circuit embraces the magneto M which is arranged to be shunted or grounded by the operation of the throttle devices formerly described. The shunt wire I' leads to one of a pair of contacts 23; the other contact 23 is grounded. The switch Sw in the present instance is of the open circuit type and operates in substantially the same manner as does the switch Sw which is illustrated in Fig. 1. It should be explained that the various coöperating devices usually employed in the ignition circuit, as for instance, the spark plugs of the engine, are omitted from the present illustration for the sake of simplicity. When the rod 10 moves toward the right on the additional movement of the throttle lever 1 toward the left, the finger 21 engages the plunger 22, causing the contacts 23 to be bridged by the metallic piece on the plunger 22, thus shunting or grounding the magneto current and cutting out the engine ignition.

In Fig. 4, the circuit I of the magneto M is arranged to be grounded upon the closure of the switch Sw which in the present instance consists of a push button on the steering wheel 2. The push button includes the fixed contact 26 which is grounded as shown, and the movable contact 27 which leads to the magneto M. The low tension circuit I includes the ignition switch 25. Under ordinary conditions, the switch Sw is open and current from the magneto flows from the magneto to the metallic portions of the car, through the switch 25 and back to the magneto. When, however, the switch Sw is closed, the current seeks the path of least resistance and flows over the wire I, through the switch Sw to ground and back to the magneto via the switch 25. It is a well known fact that a magneto may be grounded or short circuited as described without damage to the machine. This, however, is not the case of the battery B. In Fig. 4, the ignition circuit which has its source at the magneto, is arranged to be short circuited, but in Figs. 1 and 2 the ignition circuit is broken in the manner already fully described.

In Fig. 5, the arrangement is that of a battery ignition circuit, which includes the battery B and the other devices already explained. A normally closed switch Sw is mounted on the steering wheel 2 and when the operator presses the button 27 so that it disengages the contact 26, the circuit I is broken and consequently the engine stops as already pointed out. A further modification appears in Fig. 6, where a special grounding device for the magneto M is provided.

A wire 28 runs from the magneto to a metallic and insulated bracket 29 which is adapted to be engaged by the end of a bell crank lever 30. A flexible connection 31 joins the bent end 5 of the throttle rod 4 with the arm 15 of the throttle valve and in this connection, one arm of the bell crank 30 is attached. When the throttle lever 1 is turned additionally toward the right, the flexible connection 31 collapses and permits a spring 32 which is connected to the bell crank 30 to move the lower arm of the bell crank into engagement with the bracket 29 and thus close a shunt circuit from the magneto M which cuts out the spark plug S substantially in the same manner as described for the mechanism in Fig. 4.

It is thought unnecessary to describe the advantages of the device in further detail, but by way of a brief summary it may be stated that in present practice, a great many accidents are caused in automobile driving on account of the requirement on the part of the operator to perform two operations to stop the engine. These operations consist of closing the throttle and throwing off the ignition, and unfortunately the latter is never thought of until an accident has actually happened. It happens not infrequently that clutches and brakes of automobiles fail to function and this usually at critical times. Occasions have also arisen where the operator has safely stopped his car at a critical moment, but by some unintentional movement, has started the car, as by putting his foot on the electric starter button, whereupon the car flew forwardly. In an attempt to reach the brake pedal the accelerator pedal was pressed on instead, thus confusing the driver more than before and causing a serious accident. Obviously, with the use of my device the absolute stopping of the engine becomes a function which does not require second thought on the part of the operator.

As already fully pointed out, the mere act of closing the throttle lever automatically breaks the ignition circuit so as to transform the engine into an air brake and thus stop the car.

While the construction and arrangement of the automatic ignition cut-out is that of a generally preferred form, obviously modifications and changes may be made without departing from the spirit of the invention or the scope of the claims.

I claim:—

1. Instrumentalities for automatically controlling an automobile engine by opening and closing the ignition circuit, comprising in combination with the throttle controlling lever, an electric ignition switch associated therewith and automatically operated by the movement thereof, closing the nition circuit when the throttle is open, and opening the ignition circuit when the throttle is closed.

2. The combination of the ignition circuit of an engine, a throttle valve having an arm, a throttle lever, means connecting the throttle lever and throttle arm, means coacting with said connecting means and arranged to control the making and breaking of the ignition circuit, and means embodied in said connecting means enabling the operation of said controlling means upon further movement of the throttle lever after the throttle valve is closed.

3. The combination of the ignition circuit of an engine, a throttle valve having an arm, a throttle lever, means connecting the throttle lever and throttle arm, means coacting with said connecting means and arranged to control the making and breaking of the ignition circuit, and yieldable means embodied in said connecting means enabling the operation of said controlling means to break the ignition circuit upon further movement of the throttle lever after the throttle valve is closed.

4. Instrumentalities for automatically controlling an engine, comprising in combination, an engine ignition circuit, a throttle lever having an operating connection with a carbureter throttle valve arm, adapted to close the throttle valve by the movement of the throttle lever to a certain position, and yielding means embodied in said connection and having a normally non-effective relationship to said ignition circuit, but arranged to become active to break said circuit upon movement of the throttle lever beyond said position after the throttle valve is closed, said means again automatically closing said circuit on the reverse movement of the throttle lever.

5. A controlling mechanism comprising an automobile engine ignition circuit, a carbureter including a throttle valve having an arm, a throttle lever having an operating connection with said arm and adapted to close the throttle valve by the movement of the throttle lever to a certain position, means embodied in said connection and having a normally non-effective relationship to said ignition circuit, but arranged to become active to break said circuit upon movement of the throttle lever beyond said position after the throttle valve is closed, and means embodied in said connection enabling the extension of portions of said connection to permit the operation of said means upon said additional movement of the throttle lever.

6. The combination of a carbureter throttle valve and the controlling means therefor, an automobile engine ignition circuit, and means correlated with said circuit and arranged to be actuated upon movement in a predetermined direction of the controlling means for the throttle valve, to render the ignition circuit inoperative upon the arrival of the throttle valve to a closed position and upon the movement of said controlling means in said predetermined direction.

7. A device for retarding the momentum of an automobile, comprising in combination the ignition circuit of an automobile engine, a carbureter including a throttle valve and an arm, a throttle lever having a connection to said arm and arranged to close the throttle valve upon the reaching of the throttle lever at a predetermined position, and electrically operated devices operatively correlated with said ignition circuit and becoming active to break said ignition circuit to cause the automobile engine to act as an air brake, upon further movement of said throttle lever beyond said predetermined position after the throttle valve of the carbureter is closed.

8. A dual-functioning single control for an automobile engine, automatically breaking and making the ignition circuit without direct manual aid; comprising an ignition circuit for the engine, a fuel feeding carbureter with a throttle valve, and a throttle lever constituting the single control, arranged to move the throttle valve to a closed position upon partial movement, and upon continued movement to subsequently break the ignition circuit, said action occurring in reverse order on moving the throttle lever in the other direction.

9. The combination of a carbureter having a throttle valve with an arm arranged to engage a stop in the closed position, a throttle lever movable on a segment to a throttle valve closing position, connecting means between the throttle lever and said arm including a throttle rod, an automobile engine ignition circuit, circuit breaking means controlling said ignition circuit, and means carried by said throttle rod for actuating the circuit breaker upon movement of the throttle lever beyond said aforesaid closing position when the throttle valve is closed.

10. The combination of a carbureter having a throttle valve with an arm arranged to engage a stop in the closed position, a throttle lever movable on a segment to a throttle valve closing position, connecting means between the throttle lever and said arm including a throttle rod, an automobile engine ignition circuit, circuit breaking means controlling said ignition circuit, means carried by said throttle rod for actuating the circuit breaker upon movement of the throttle lever beyond said aforesaid closing position when the throttle valve is closed, and means interposed in the throttle rod providing a yieldable connection enabling the additional movement of the throttle rod, including a frame carried by a portion of said rod, and a spring carried by another portion of said rod.

11. An interrupting device for the ignition circuit of an automobile engine, comprising in combination a throttle valve with an arm arranged to be moved to the closed position against a stop, a throttle lever movable on a segment to a closing position, a yieldable connection between a portion of the throttle lever and said arm, an ignition circuit including a source of electrical energy, and a movable member joined with said yieldable connection and arranged to interrupt the function of said ignition circuit and render the engine "dead" upon continued movement of the throttle lever beyond said closing position.

WILLIAM M. EDMONT.

Copies of this patent may be obtained for five cents each, by addressing the "Commissioner of Patents, Washington, D. C."